United States Patent
Dirnfeldner

(10) Patent No.: US 7,296,956 B2
(45) Date of Patent: Nov. 20, 2007

(54) MACHINE-TOOL OR PRODUCTION MACHINE WITH HEAD-UP DISPLAY

(75) Inventor: Rainer Dirnfeldner, Röttenbach (DE)

(73) Assignee: Siemens Aktiengesellschaft, München (DE)

( * ) Notice: Subject to any disclaimer, the term of this patent is extended or adjusted under 35 U.S.C. 154(b) by 423 days.

(21) Appl. No.: 10/862,017

(22) Filed: Jun. 4, 2004

(65) Prior Publication Data

US 2005/0002151 A1    Jan. 6, 2005

(30) Foreign Application Priority Data

Jun. 6, 2003    (DE) ................. 103 25 895

(51) Int. Cl.
*B23Q 11/03* (2006.01)
*B23Q 17/24* (2006.01)
*B23Q 11/08* (2006.01)

(52) U.S. Cl. ............. 409/235; 409/134; 451/6; 345/7; 359/13; 348/115

(58) Field of Classification Search ........... 409/234, 409/134; 359/630, 13, 632, 770; 451/6; 353/7, 121, 122; 345/7, 8; 348/115; 349/11
See application file for complete search history.

(56) References Cited

U.S. PATENT DOCUMENTS

| | | | | |
|---|---|---|---|---|
| 2,481,381 | A * | 9/1949 | Banko | 353/67 |
| 2,591,227 | A * | 4/1952 | Banko | 451/340 |
| 4,884,145 | A * | 11/1989 | Kaye et al. | 348/189 |
| 5,096,281 | A * | 3/1992 | Windebank et al. | 359/868 |
| 5,291,316 | A * | 3/1994 | Haberman et al. | 359/13 |
| 5,394,521 | A * | 2/1995 | Henderson et al. | 715/804 |
| 5,818,455 | A * | 10/1998 | Stone et al. | 345/619 |
| 6,301,007 | B1 * | 10/2001 | Hanlon et al. | 356/400 |
| 6,353,428 | B1 * | 3/2002 | Maggioni et al. | 345/157 |
| 6,456,438 | B1 | 9/2002 | Lee et al. | |
| 2002/0005915 | A1 | 1/2002 | Rodriguez | |
| 2003/0231261 | A1 | 12/2003 | Bassi et al. | |

FOREIGN PATENT DOCUMENTS

| | | |
|---|---|---|
| DE | 40 29 312 A | 3/1992 |
| DE | 197 08 240 A1 | 9/1998 |
| DE | 101 44 075 A1 | 4/2003 |
| EP | 0 413 954 A | 2/1991 |
| JP | 06067804 A | 3/1994 |
| JP | 11156677 A | 6/1999 |
| WO | WO 00/52541 A1 | 9/2000 |

OTHER PUBLICATIONS

JPO Website translation of JP11-156677A.*

* cited by examiner

*Primary Examiner*—Dana Ross
(74) *Attorney, Agent, or Firm*—Henry M. Feiereisen; Ursula B. Day

(57) ABSTRACT

A machine-tool production machine is disclosed, with a workspace that can be viewed by an operator through a window or transparent pane, whereby the window or transparent pane can be used with a projection unit as a head-up display for displaying information for the operator. The device provides the operator with a simple, cost-effective and clear representation of information about the manufacturing and production processes as well as other processes running on the machine.

8 Claims, 2 Drawing Sheets

MACHINE-TOOL OR PRODUCTION MACHINE WITH HEAD-UP DISPLAY

CROSS-REFERENCES TO RELATED APPLICATIONS

This application claims the priority of German Patent Application, Serial No. 103 25 895.7, filed Jun. 6, 2003, pursuant to 35 U.S.C. 119(a)-(d), the disclosure of which is incorporated herein by reference.

BACKGROUND OF THE INVENTION

The present invention relates to a machine-tool or production machine, and more particularly to a machine with a workspace that can be viewed by an operator through a transparent window.

Most commercially available modern machine-tools or production machines include a display unit and/or a control panel that can be used on location to parameterize, control and monitor a manufacturing or production process. The display unit typically includes a cathode ray tube or an LCD display, which is generally located on the side or the front of the machine and can be an integral component of a control panel. The display unit can also be mounted on a movable boom.

Another type of display unit known in the art is a head-up display. A head-up display is a device that can be used to superimpose information on a background for viewing by the operator. The image to be displayed is here projected onto a transparent window, so that both the image and the background can be viewed simultaneously. Head-up displays are already in use for some time in airplanes and are just now becoming available for use in automobiles. A head-up display can be used instead of or in addition to a conventional display unit or control panel.

The workspace of machine-tools or production machines is typically enclosed, with access provided by a protective door. The workspace can generally be viewed and monitored by an operator through a window or a transparent pane. These transparent windows enable an operator to monitor the manufacturing and production processes, but do not provide additional information that may be useful to an operator.

It would therefore be desirable and advantageous to provide an improved device and method for visualization of information about the manufacturing and production process and other processes running on a machine tool or production machine, which obviates prior art shortcomings and is able to specifically combine a visualization of machine-related information with an actual view of the processes running in or on the machine.

SUMMARY OF THE INVENTION

The system and method of the invention described herein are directed, inter alia, to a head-up display that displays to an operator in a particularly clear manner information of the machine parameters and superimposes this information on the actual machine layout.

By using one or more transparent windows or other types of transparent partitions, for example a partition made of glass or a transparent plastic material, as a projection surface, then the operator can directly relate the projected information to processes performed in the workspace of the machine that is visible in the background. This concept is particularly suited for novel applications, for example, during startup, manufacturing, production, diagnostics and service, where it is desirable to closely link the displayed information to processes running in the workspace of the machine. Visualization of the information related to the superimposed ambient information can be referred to as contact-analog representation. Particularly advantageous can be a three-dimensional holographic visualization, where the displayed image virtually "enters" the workspace of the machine and blends with the actual machine components.

According to one aspect of the present invention, a machine-tool or production machine includes an enclosure defining a workspace, a transparent window secured on the enclosure and enabling an operator to view the workspace, and a projection unit projecting a pattern onto the window. The pattern contains information to be displayed to the operator. The window in conjunction with the projected pattern can be viewed as a head-up display.

According to another aspect of the invention, a method for producing a head-up display for a machine-tool or production machine includes providing in the machine a transparent window for allowing an operator to view a workspace, and projecting a pattern onto the window wherein the pattern contains information to be displayed to the operator while viewing the workspace.

By integrating a head-up display with existing machine components, a display unit or a control panel can essentially "melt together" with the machine. A display or control panel can be implemented cost-effectively due to the reduced space requirement and the reduced number of components. The superposition of operator information in the machine space by the head-up display represents a fundamental innovation for machine startup, production processes, diagnostics and service. For example, faults in the manufacturing and production process can be directly indicated and superimposed at the location where they occurred. In addition, operating instructions can be visualized directly on the machine either step-by-step or separately for each process step which makes their evaluation much easier than with a disconnected, abstract representation on a conventional display screen.

The head-up display, unlike the afore-described conventional display units or control panels, can also withstand much better harsher environmental conditions typically found in a manufacturing environment.

According to an advantageous embodiment of the invention, the window can be configured so as to allow an operator to enter data and/or commands for controlling the machine. The head-up display can replace a conventional control panel, since the head-up display can also capture data and commands for controlling the machine in addition to merely display information.

According to another advantageous embodiment of the invention, the data and commands can be recorded by a camera or a touch-sensitive screen disposed on or integrated with the window. This allows a reliable acquisition of data and commands.

According to yet another advantageous embodiment of the invention, the projection unit can be mounted on an outside surface of the enclosure. This is advantageous since adverse environmental conditions typically found inside the machine that could impair the operation of the projection unit, for example dirt, generally do not exist outside the machine.

According to still another advantageous embodiment of the invention, the displayed information can include operating parameters, operating instructions, a graphic visualization of simulated machine processes, and/or a graphic visualization of process flows. Such information is of great interest to the operator for understanding and controlling the manufacturing or production process.

Advantageously, the projected pattern can include a three-dimensional holographic image that virtually extends into the workspace of the machine. With a three-dimensional holographic representation that virtually enters the workspace of the machine, the operator can control and visualize the manufacturing and production process in three dimensional space.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
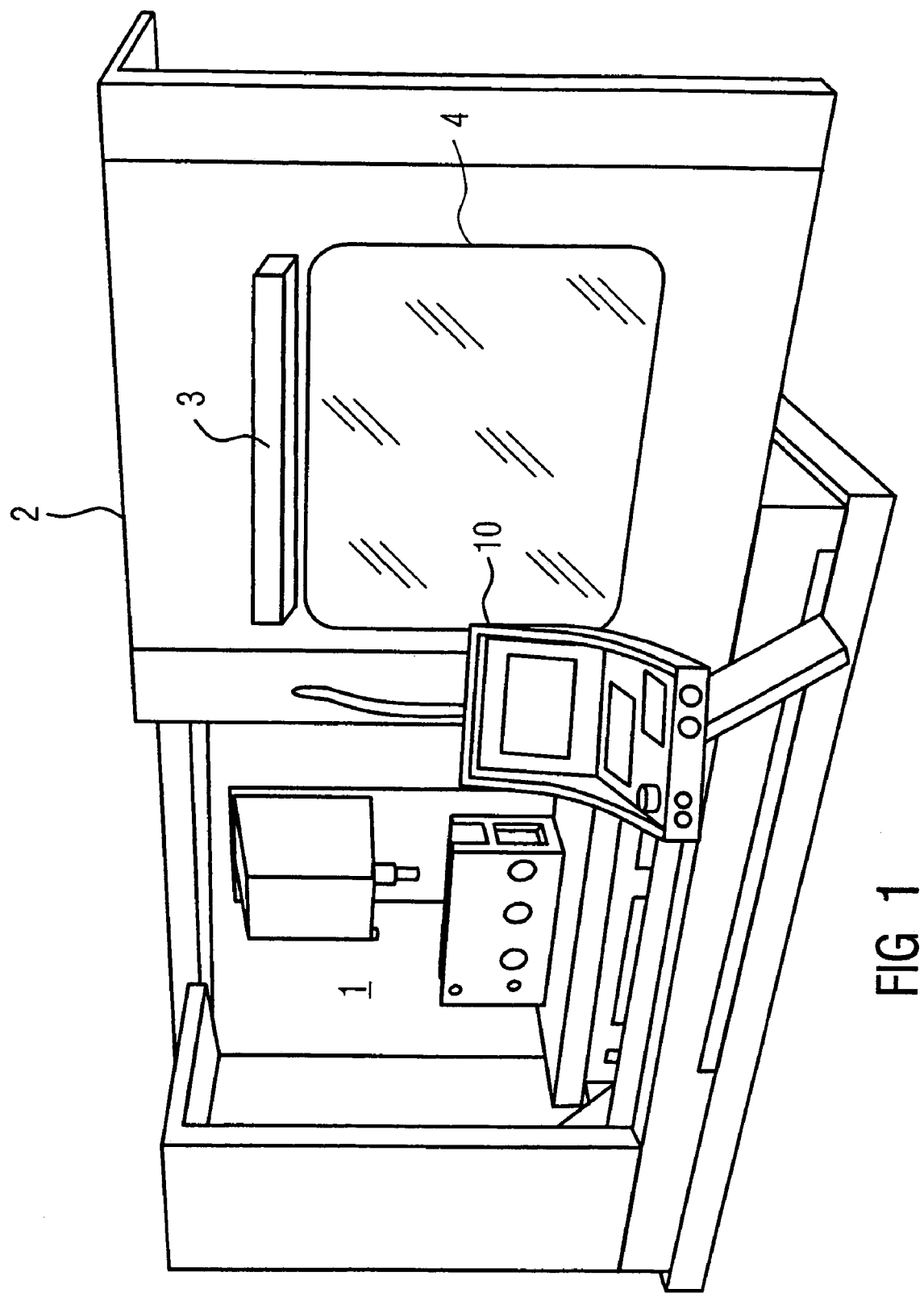
FIG. 1 shows a machine-tool according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown one embodiment of a machine-tool according to the present invention. The workspace 1 of the machine, where the actual manufacturing and production process takes place, is separated from the operator of the machine by a sliding door 2 which can be closed. FIG. 1 shows the machine with the sliding door 2 in an open position. The machine can be operated on-site be a control panel 10.

A window or transparent pane 4, which in the exemplary embodiment can be made of glass, is installed in the sliding door 2. When the sliding door 2 is closed, the operator can view the workspace 1 through the window 4. A projection unit 3 is located above the window 4 on the outside of the sliding door 2 of the machine. The projection unit 3 is used to project onto the transparent window 4 the image to be displayed, so that both the image and the background can be viewed simultaneously by an observer.

Figure 2:
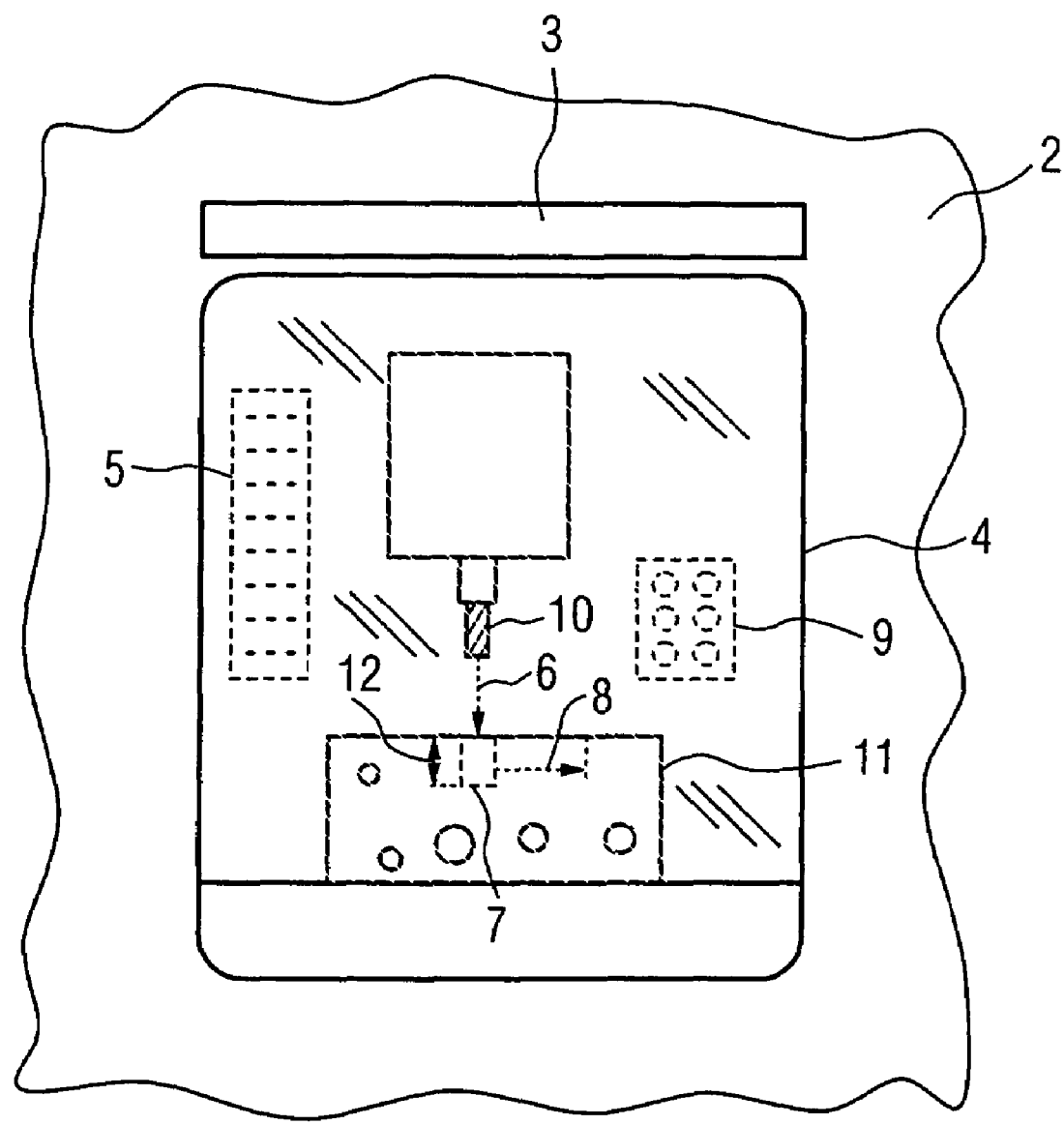
FIG. 2 shows a diagram of a head-up display.

FIG. 2 shows a view seen by an observer through the window 4 into the workspace 1 when the sliding door 2 is in the closed position and the projection unit 3 is switched on. The reference numerals 2, 3 and 4 refer to the same elements as in FIG. 1. The clamped milling tool 10 as well as the machined workpiece 11 are visible through the window 4. Additional information for the operator is now projected by the projection unit 2 onto the window 4. In the depicted embodiment, a virtual information field 5 that indicates step-by-step process flows is superimposed for the operator. The arrows 6, 8 projected by the projection unit 3 as well as the projected cutout 7 and the projected dimensioning 12 signal the operator the next production step, which in the depicted embodiment includes milling a groove in the workpiece 11. The observer can readily monitor the manufacturing and production process closely with the help of the projected virtual information.

Advantageously, the projection unit 3 can also project a three-dimensional holographic representation onto the window 4. The holographic representation then appears to optically "enter" the workspace 1 of the machine, so that the display essentially "melts together" with the physical machine elements and/or workpieces. This gives the operator comprehensible control options during machine startup, diagnostics, service as well as during the normal manufacturing and production operations.

In addition, in the depicted embodiment the projection unit 3 also projects a virtual keypad 9 onto the window 4. Input operations on the virtual keypad 9 are captured optically, for example with the help of a camera integrated in the projection unit 3, and are transmitted to the machine controller. The allows can thereby control the machine on-site by using the keypad 9 and—optionally—additional input fields, which are not illustrated in FIG. 2 for sake of clarity.

Data and command input can also be provided via one or more virtual keypads, or via a touch-sensitive transparent screen or pane, whereby the observation window can be advantageously also implemented as a touch-sensitive window. In addition, other virtual input means (e.g., a virtual mouse) can be used instead of or in addition to the virtual keypad used in the depicted exemplary embodiment.

The head-up display formed of the window 4 and the projection unit 3 can be provided in addition to the control panel 10, as shown in FIG. 1, or can replace the control panel 10 completely, which then becomes obsolete.

The size of the display that can be realized with the depicted head-up projection technique is essentially limited only by the available projection area, i.e., the area of the window. Accordingly, the size of the display, the type of the display and the amount of information that can be simultaneously displayed can be selected with substantial flexibility. The display can be easily adapted to the machine size and scaled to meet customer requirements.

Moreover, results of previously generated external simulations can be projected by the head-up display, which can then be used to visually control the production process in the workspace of the machine. Any faults and errors can then be easily detected.

Machine tools in the context of the present invention can also include, for example, uniaxial or multi-axis lathes, milling machines, as well as drilling or grinding machines. Machine tools can further include processing centers, linear and rotary transfer machines, laser machines, rolling machines and/or gear cutters. These machines have in common that the material is machined along several axes. Production machines in the context of the present invention can include textile, paper, plastic, wood, glass, ceramic or stone processing machines, as well as machines used for forming, packaging, printing, conveying, lifting, pumping, transporting. Furthermore, fans, blowers, wind turbines, lifting gear, cranes, robots, production and assembly lines are also included under the term production machines in the context of the present invention.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A machine-tool or production machine comprising:
   an enclosure defining a workspace;
   at least one transparent touch-sensitive window secured on the enclosure and enabling an operator to view the workspace;
   a projection unit projecting a pattern onto the window, said pattern containing information to be displayed to the operator in form of a head-up display,
   wherein said touch-sensitive window is responsive to data or command input, or both, for controlling the machine.

2. The machine-tool or production machine of claim 1, wherein the touch-sensitive window comprises a touch-sensitive screen and the data or commands are recorded by the touch-sensitive screen.

3. The machine-tool or production machine of claim 1, wherein the projection unit is mounted on an outside surface of the enclosure.

4. The machine-tool or production machine of claim 1, wherein the displayed information is selected from the group consisting of operating parameters, operating instructions, a graphic visualization of simulated machine processes, and a graphic visualization of process flows.

5. The machine-tool or production machine of claim 1, wherein the projected pattern comprises a three-dimensional holographic image that virtually extends into the workspace of the machine.

6. A method for controlling a machine-tool or production machine, comprising:
   providing in the machine a transparent window for allowing an operator to view a workspace;
   projecting a pattern onto the window, said pattern containing information to be displayed to the operator while viewing the workspace;
   entering data or commands for controlling the machine on the projected pattern;
   acquiring the entered data or commands with a camera or a touch-sensitive screen disposed on or integrated with the window, or both; and
   controlling a machine-tool or production machine based on the acquired data or with the acquired commands.

7. The method of claim 6, wherein the displayed information is selected from the group consisting of operating parameters, operating instructions, a graphic visualization of simulated machine processes, and a graphic visualization of process flows.

8. The method of claim 6, wherein the projected pattern comprises a three-dimensional holographic image that virtually extends into the workspace of the machine.

* * * * *